(12) United States Patent
Alam

(10) Patent No.: US 7,340,535 B1
(45) Date of Patent: Mar. 4, 2008

(54) SYSTEM AND METHOD FOR CONTROLLING ROUTING IN A VIRTUAL ROUTER SYSTEM

(75) Inventor: Naveed Alam, Cupertino, CA (US)

(73) Assignee: Fortinet, Inc., Sunnyvale, CA (US)

( * ) Notice: Subject to any disclaimer, the term of this patent is extended or adjusted under 35 U.S.C. 154(b) by 782 days.

(21) Appl. No.: 10/163,071

(22) Filed: Jun. 4, 2002

(51) Int. Cl.
*G06F 15/16* (2006.01)
*G06F 15/173* (2006.01)
*H04L 12/18* (2006.01)

(52) U.S. Cl. ............ 709/246; 709/217; 709/236; 709/238; 370/392

(58) Field of Classification Search ........ 709/236, 709/238–246, 217–222; 370/389, 395.2; 726/2–21
See application file for complete search history.

(56) References Cited

U.S. PATENT DOCUMENTS

| | | | |
|---|---|---|---|
| 4,667,287 A | 5/1987 | Allen et al. ........... 709/234 |
| 5,400,331 A * | 3/1995 | Lucak et al. ........... 370/401 |
| 5,442,708 A | 8/1995 | Adams et al. |
| 5,473,599 A | 12/1995 | Li et al. |
| 5,490,252 A | 2/1996 | Macera et al. .......... 709/200 |
| 5,581,705 A | 12/1996 | Passint et al. .......... 709/200 |
| 5,606,668 A * | 2/1997 | Shwed ................ 726/13 |
| 5,633,866 A | 5/1997 | Callon |
| 5,745,778 A | 4/1998 | Alfieri ................ 712/1 |
| 5,812,779 A | 9/1998 | Ciscon et al. |
| 5,825,772 A | 10/1998 | Dobbins et al. ........ 370/396 |
| 5,825,891 A | 10/1998 | Levesque et al. |
| 5,835,726 A * | 11/1998 | Shwed et al. .......... 709/229 |
| 5,841,973 A | 11/1998 | Kessler et al. ......... 709/250 |
| 5,875,290 A | 2/1999 | Bartfai et al. |
| 5,963,555 A | 10/1999 | Takase et al. .......... 370/395.52 |
| 5,987,521 A | 11/1999 | Arrowood et al. |
| 6,014,382 A | 1/2000 | Takihiro et al. ........ 370/399 |
| 6,032,193 A | 2/2000 | Sullivan |
| 6,047,330 A | 4/2000 | Stracke, Jr. ........... 709/238 |
| 6,069,895 A | 5/2000 | Ayandeh .............. 370/399 |
| 6,085,238 A | 7/2000 | Yuasa et al. |
| 6,098,110 A | 8/2000 | Witkowski et al. ...... 709/249 |
| 6,118,791 A | 9/2000 | Fichou et al. |
| 6,137,777 A | 10/2000 | Vaid et al. |

(Continued)

FOREIGN PATENT DOCUMENTS

WO     0051290     8/2000

(Continued)

OTHER PUBLICATIONS

Knight et al. "Virtual Router Redundancy Protocol" RFC 2338, Apr. 1998.*

(Continued)

*Primary Examiner*—Joseph E. Avellino
(74) *Attorney, Agent, or Firm*—Hamilton, DeSanctis & Cha, LLP

(57) ABSTRACT

One or more functions are applied to network data packets in a virtual router. A packet comprising part of a packet flow is received, and the packet is evaluated to determine which of the one or more functions are to be applied to the flow. The results of the evaluation are stored in a record, and the functions indicated in the stored record are applied to subsequent packets in the packet flow.

16 Claims, 5 Drawing Sheets

U.S. PATENT DOCUMENTS

| | | | |
|---|---|---|---|
| 6,147,976 A * | 11/2000 | Shand et al. | 370/254 |
| 6,169,739 B1 | 1/2001 | Isoyama | 370/395.54 |
| 6,169,793 B1 | 1/2001 | Gowdin et al. | 379/207 |
| 6,173,333 B1 | 1/2001 | Jolitz et al. | |
| 6,173,399 B1 | 1/2001 | Gilbrech et al. | |
| 6,175,867 B1 | 1/2001 | Taghadoss | 709/241 |
| 6,192,051 B1 | 2/2001 | Lipman et al. | |
| 6,220,768 B1 | 4/2001 | Barroux | 709/224 |
| 6,226,788 B1 | 5/2001 | Schoening et al. | 717/6 |
| 6,243,580 B1 | 6/2001 | Garner | |
| 6,249,519 B1 | 6/2001 | Rangachar | |
| 6,260,072 B1 | 7/2001 | Rodriguez-Moral | 709/241 |
| 6,260,073 B1 | 7/2001 | Walker et al. | 709/249 |
| 6,266,695 B1 | 7/2001 | Huang et al. | 709/223 |
| 6,278,708 B1 | 8/2001 | Von Hammerstein et al. | |
| 6,286,038 B1 | 9/2001 | Reichmeyer et al. | 709/220 |
| 6,295,297 B1 | 9/2001 | Lee | 370/395.61 |
| 6,298,130 B1 | 10/2001 | Galvin | 379/219 |
| 6,304,975 B1 * | 10/2001 | Shipley | 726/22 |
| 6,320,859 B1 | 11/2001 | Momirov | |
| 6,330,602 B1 | 12/2001 | Law et al. | 709/224 |
| 6,338,092 B1 | 1/2002 | Chao et al. | 709/236 |
| 6,381,644 B2 | 4/2002 | Munguia et al. | 709/225 |
| 6,405,262 B1 | 6/2002 | Vogel et al. | |
| 6,414,595 B1 | 7/2002 | Scrandis et al. | |
| 6,434,619 B1 | 8/2002 | Lim et al. | 709/229 |
| 6,438,612 B1 | 8/2002 | Ylonen et al. | 709/249 |
| 6,449,650 B1 | 9/2002 | Westfall et al. | 709/228 |
| 6,459,682 B1 | 10/2002 | Ellesson et al. | |
| 6,463,061 B1 | 10/2002 | Rekhter et al. | 370/392 |
| 6,466,976 B1 | 10/2002 | Alles et al. | 709/224 |
| 6,496,935 B1 * | 12/2002 | Fink et al. | 726/13 |
| 6,526,056 B1 | 2/2003 | Rekhter et al. | 370/392 |
| 6,532,088 B1 | 3/2003 | Dantu et al. | |
| 6,542,466 B1 | 4/2003 | Pashtan et al. | |
| 6,549,954 B1 | 4/2003 | Lambrecht et al. | |
| 6,556,544 B1 | 4/2003 | Lee | 370/256 |
| 6,606,315 B1 * | 8/2003 | Albert et al. | 370/352 |
| 6,608,816 B1 | 8/2003 | Nichols | |
| 6,609,153 B1 | 8/2003 | Salkewicz | |
| 6,631,519 B1 | 10/2003 | Nicholson et al. | |
| 6,636,516 B1 | 10/2003 | Yamano | 341/126 |
| 6,639,897 B1 | 10/2003 | Shiomoto et al. | 370/238 |
| 6,658,013 B1 | 12/2003 | de Boer et al. | 370/404 |
| 6,674,756 B1 | 1/2004 | Rao et al. | |
| 6,687,220 B1 | 2/2004 | Ayres | |
| 6,697,359 B1 | 2/2004 | George | |
| 6,697,360 B1 | 2/2004 | Gai et al. | 370/389 |
| 6,738,371 B1 * | 5/2004 | Ayres | 370/352 |
| 6,775,267 B1 | 8/2004 | Kung et al. | |
| 6,775,284 B1 | 8/2004 | Calvignac et al. | |
| 6,850,531 B1 * | 2/2005 | Rao et al. | 370/401 |
| 6,856,676 B1 | 2/2005 | Pirot et al. | |
| 6,868,082 B1 | 3/2005 | Allen et al. | |
| 6,883,170 B1 | 4/2005 | Garcia | |
| 6,901,517 B1 * | 5/2005 | Redmore | 726/11 |
| 6,938,095 B2 | 8/2005 | Basturk et al. | |
| 6,938,097 B1 | 8/2005 | Vincent | |
| 6,944,128 B2 | 9/2005 | Nichols | |
| 6,944,168 B2 | 9/2005 | Paatela et al. | |
| 6,954,429 B2 | 10/2005 | Horton et al. | |
| 6,985,438 B1 | 1/2006 | Tschudin | |
| 6,999,454 B1 | 2/2006 | Crump | |
| 7,020,143 B2 | 3/2006 | Zdan | |
| 7,039,053 B1 * | 5/2006 | Freed et al. | 370/392 |
| 7,042,843 B2 | 5/2006 | Ni | |
| 7,042,848 B2 | 5/2006 | Santiago et al. | |
| 7,096,383 B2 | 8/2006 | Talaugon | |
| 7,111,072 B1 | 9/2006 | Matthews | |
| 7,116,665 B2 | 10/2006 | Balay | |
| 7,161,904 B2 | 1/2007 | Hussain | |
| 7,203,192 B2 | 4/2007 | Desai | |
| 2001/0043571 A1 | 11/2001 | Jang et al. | 370/260 |
| 2001/0048661 A1 | 12/2001 | Clear et al. | |
| 2001/0052013 A1 | 12/2001 | Munguia et al. | |
| 2002/0062344 A1 * | 5/2002 | Ylonen et al. | 709/204 |
| 2002/0066034 A1 | 5/2002 | Schlossberg et al. | 713/201 |
| 2002/0075901 A1 | 6/2002 | Perlmutter et al. | |
| 2002/0097872 A1 | 7/2002 | Barbas et al. | |
| 2002/0099849 A1 | 7/2002 | Alfieri et al. | |
| 2002/0116501 A1 * | 8/2002 | Ho et al. | 709/227 |
| 2002/0126672 A1 * | 9/2002 | Chow et al. | 370/392 |
| 2002/0150114 A1 * | 10/2002 | Sainomoto et al. | 370/402 |
| 2002/0152373 A1 * | 10/2002 | Sun et al. | 713/150 |
| 2002/0186661 A1 | 12/2002 | Santiago et al. | |
| 2002/0188657 A1 | 12/2002 | Traversat et al. | |
| 2002/0191604 A1 | 12/2002 | Mitchell et al. | |
| 2002/0194378 A1 * | 12/2002 | Foti | 709/246 |
| 2003/0033401 A1 | 2/2003 | Poisson et al. | 709/224 |
| 2003/0043792 A1 * | 3/2003 | Carpini et al. | 370/386 |
| 2003/0051048 A1 * | 3/2003 | Watson et al. | 709/238 |
| 2003/0074473 A1 * | 4/2003 | Pham et al. | 709/246 |
| 2003/0076838 A1 * | 4/2003 | Shaio et al. | 370/395.5 |
| 2003/0081559 A1 | 5/2003 | Matuoka et al. | |
| 2003/0091021 A1 | 5/2003 | Trossen et al. | |
| 2003/0108041 A1 * | 6/2003 | Aysan et al. | 370/389 |
| 2003/0115308 A1 | 6/2003 | Best et al. | |
| 2003/0117954 A1 | 6/2003 | De Neve et al. | |
| 2003/0131228 A1 | 7/2003 | Tworney | |
| 2003/0169747 A1 | 9/2003 | Wang | |
| 2003/0185226 A1 | 10/2003 | Tang et al. | |
| 2003/0200295 A1 | 10/2003 | Roberts et al. | |
| 2003/0212735 A1 * | 11/2003 | Hicok et al. | 709/201 |
| 2003/0223406 A1 | 12/2003 | Balay | |
| 2003/0223418 A1 | 12/2003 | Desai et al. | |
| 2003/0223456 A1 | 12/2003 | DiMambro | |
| 2004/0042416 A1 | 3/2004 | Ngo et al. | |
| 2004/0095934 A1 | 5/2004 | Cheng et al. | |
| 2004/0141521 A1 | 7/2004 | George | |
| 2004/0160900 A1 | 8/2004 | Lund et al. | |
| 2004/0199567 A1 | 10/2004 | Lund | |
| 2004/0199568 A1 | 10/2004 | Lund | |
| 2004/0199569 A1 | 10/2004 | Kalkunte et al. | |
| 2005/0047407 A1 | 3/2005 | Desai et al. | |
| 2005/0188106 A1 | 8/2005 | Pirbhai et al. | |
| 2006/0087969 A1 | 4/2006 | Santiago et al. | |
| 2006/0140185 A1 | 6/2006 | Norman et al. | |

FOREIGN PATENT DOCUMENTS

| | | |
|---|---|---|
| WO | WO-00/76152 | 12/2000 |
| WO | 0163809 | 8/2001 |
| WO | WO-02/23855 | 3/2002 |
| WO | 0310323 | 12/2003 |
| WO | WO-03/103237 A1 | 12/2003 |

OTHER PUBLICATIONS

"International Search Report", for PCT application PCT/US 03/17674, 6 Pages.

Chan, Mun C., et al., "An architecture for broadband virtual networks under customer control", *IEEE Network Operations and Management Symposium*, (Apr. 15-19, 1996), 135-144.

Chan, M. C., et al., "Customer Management and Control of Broadband VPN Services", *Proc. Fifth IFIP/IEEE International Symposium on Integrated Network Management*, (May 1997),301-314.

Gasparro, D. M., "Next-Gen VPNs: The Design Challenge", *Data Communications*, (Sep. 1999),83-95.

Hanaki, M , et al., "LAN/WAN management integration using ATM CNM interface", *IEEE Network Operations and Management Symposium*, vol. 1, (Apr. 15-19, 1996),12-21.

Hussain, Z., "Service Processing Switch", U.S. Appl. No. 10/163,260, filed Jun. 4, 2002.

Hussain, Z., et al., "System and Method for Routhing Traffic Through a Virtual Router-Based Network Switch", U.S. App. No. 10/163,079, filed Jun. 4, 2002.

Kapustka, K., et al., "CoSine Communications Moves VPNs 'Into the Cloud' with the Leading Managed IP Service Delivery Platform", http://www.cosinecom.com/news/pr_5_24.html, Press Release, CoSine Communications,(1999),5 p.

Keshav, Srinivsan, "An Engineering Approach to Computer Networking: ATM networks, the internet, and the telephone network", Reading, Mass. : Addison-Wesley, Addison-Wesley Professional Computing Series,(1992),318-324.

Kim, E. C., et al., "The Multi-Layer VPN Management Architecture", *Proc. Sixth IFIP/IEEE International Symposium on Integrated Network Management*, (May 1999), 187-200.

Matthews, A. R., "System and Method for Delivering Security Services", U.S. Appl. No. 09/661,637, filed Sep. 13, 2000.

Rao, J. R., "Intranets and VPNs: Strategic Approach", *1998 Annual Review of Communications*, (1998),669-674.

Tanenbaum, A. S., "Computer Networks", *Upper Saddle River, N.J. : Prentice Hall PTR*, 3rd Edition,(1996),348-364.

European Search Report for PCT/US03/37009 (Jul. 4, 2004) 2 pgs.

International Search Report for PCT/US03/17674, 6 pgs.

* cited by examiner

SYSTEM AND METHOD FOR CONTROLLING ROUTING IN A VIRTUAL ROUTER SYSTEM

FIELD OF THE INVENTION

The invention relates generally to computerized networks, and more specifically to a system and method for controlling routing in a virtual routing system.

BACKGROUND OF THE INVENTION

Computer networks are becoming increasingly important to the way computers are used for business, recreation, and communication. The ability of a computer network to easily and efficiently move data from a sender to the intended destination is critical to the usefulness of computer networks, and to their ability to handle the large amount of varying traffic that is encountered in modern network environments.

Networks are often characterized as local area networks (LANs) or wide area networks (WANs). LANs typically comprise anywhere from a few computers sharing a common network to large groups of computers located physically near each other such as an entire building's network. WANs are larger in scope, and include networks that have geographically dispersed computers such as the Internet. Networks can be further characterized by the types of data that they carry or the protocols they use, such as IPX networks that are often found in Novell local area networks, and TCP/IP networks that are often found in the Internet and in other LANs and WANs. Also, different physical network connections and media such as Ethernet, Token Ring, Asynchronous Transfer Mode (ATM), and Frame Relay exist, and can be carried over copper, optical fiber, via radio waves, or through other media.

Networks of different types or that are geographically dispersed can be interconnected via technologies, such as routers, switches, and bridges. Bridges simply translate one network protocol to another and provide a communications "bridge" between different types of networks. Switches allow connectivity of a number of switched devices on a network to a single network connection, and in effect filter and forward packets between the network connection and the various attached devices. Routers typically do little filtering of data, but receive data from one network and determine how to direct the data to the intended destination networked device. Routers typically use headers of a packet, such as an IP packet header for Internet communication to determine the intended destination for a packet, and communicate with other routers using protocols, such as the Internet Control Messaging Protocol (ICMP), to determine a desired route for a packet to travel from one network device to another. Routers therefore are primarily responsible for receiving network traffic and routing it across multiple LANs or across a WAN to the intended destination.

Data packet routing is a critical element of network performance, and can become a problem if large local area networks send a lot of network traffic through a single router connection to other networks. Factors such as transforming data of one type or in one protocol to another protocol or format can require significant processing, and serve to further tax the ability of routers to connect various types of networks. Some routers incorporate multiple processors to handle different data protocols and formats, and are configured by the manufacturer by specially configuring the hardware or by hard-coding elements of software to meet specific requirements of a specific customer application. Unfortunately, using such a router in a changed environment is often less than optimal, and reconfiguration of the router would require re-coding the control software or replacement of hardware elements. Further, performance of the various functions performed on each packet in a stream of packets is often not optimal, both because certain parts of the packet forwarding process are repeated and because the various resources available may not be allocated in a manner efficient for some situations.

It is therefore generally desirable to have a system or method for controlling routing of network data that provides efficient configuration of routing functionality and that optimizes use of available resources.

SUMMARY OF THE INVENTION

A system for applying one or more functions to network data packets in a virtual router is provided. A packet comprising part of a packet flow is received, and the packet is evaluated to determine which of the one or more functions are to be applied to the flow. The results of the evaluation are stored in a record, and the functions indicated in the stored record are applied to subsequent packets in the packet flow.

DETAILED DESCRIPTION

In the following detailed description of sample embodiments of the invention, reference is made to the accompanying drawings which form a part hereof, and in which is shown by way of illustration specific sample embodiments in which the invention may be practiced. These embodiments are described in sufficient detail to enable those skilled in the art to practice the invention, and it is to be understood that other embodiments may be utilized and that logical, mechanical, electrical, and other changes may be made without departing from the spirit or scope of the present invention. The following detailed description is, therefore, not to be taken in a limiting sense, and the scope of the invention is defined only by the appended claims.

The present invention comprises in one embodiment a system for applying one or more functions to network data packets in a virtual router. A packet comprising part of a packet flow is received, and the packet is evaluated to determine which of the one or more functions are to be applied to the flow. The results of the evaluation are stored in a record, and the functions indicated in the stored record are applied to subsequent packets in the packet flow.

Application of these functions occurs in one embodiment in the context of a virtual router operating on a user-configurable and scalable virtual router system. Examples of such a system are described in detail herein to provide context for understanding operation of the invention, but are only examples of one of many possible implementations of the present invention.

Figure 1:
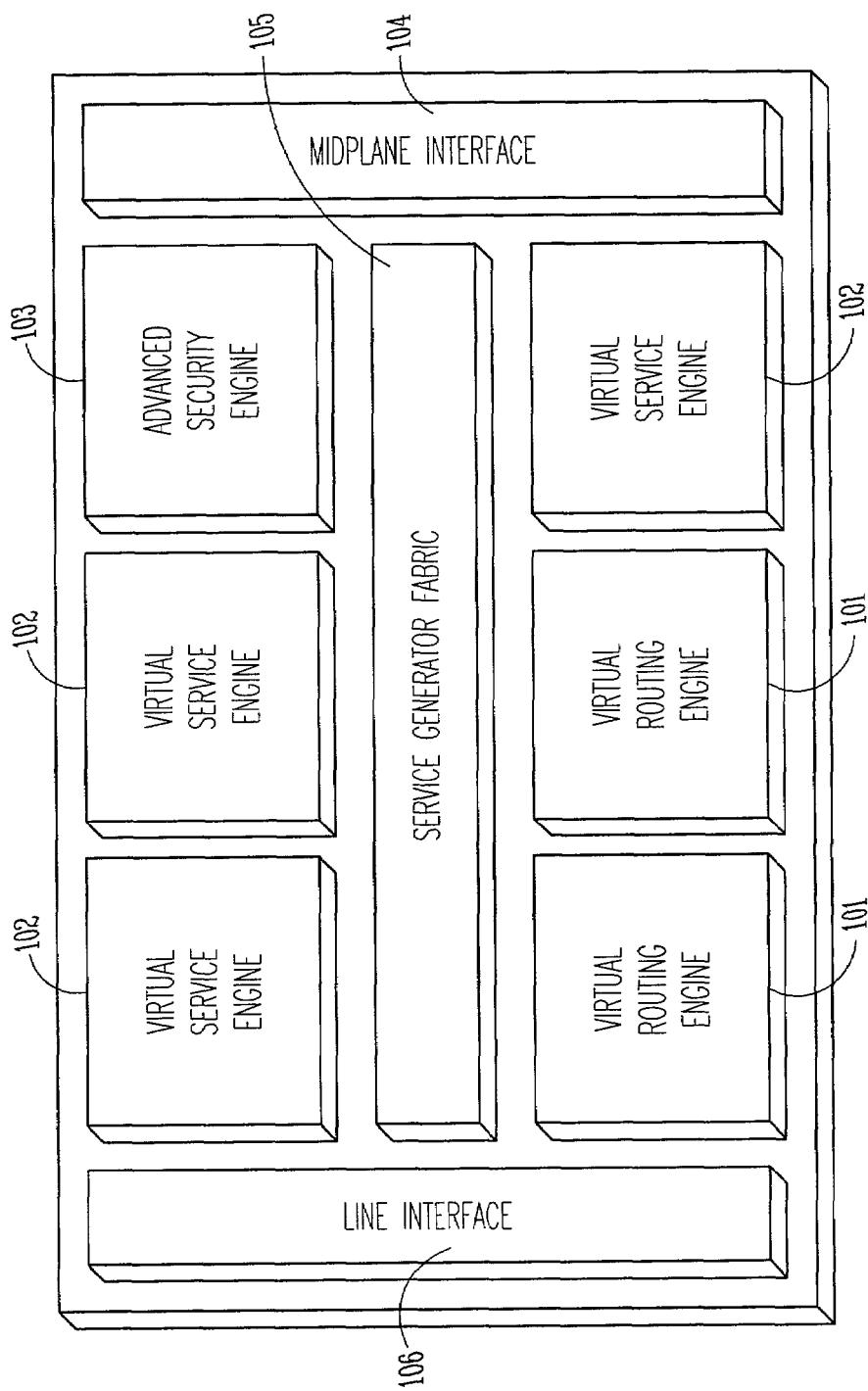
FIG. 1 shows a block diagram of the Internet Protocol Service Generator router architecture, consistent with an embodiment of the present invention.

FIG. 1 shows a block diagram of the Internet Protocol Service Generator (IPSG) router architecture, consistent with an exemplary embodiment of the present invention. The IPSG architecture is an architecture that manages switching, routing, and computing resources within a user-configurable hardware router architecture. The architecture provides user-level service customization and configuration, and provides scalability for future expansion and reconfiguration. The IPSG, shown generally in FIG. 1, comprises one or more virtual routing engines 101 that provide routing capability in the virtual services environment of the IPSG architecture. One or more virtual service engines 102 provide packet processing capability in a virtual services environment. The advanced security engine 103 provides processing capability specifically directed to security functionality for security protocols such as IPSec. The functions provided may include, but are not limited to, 3DES/RC4 SHA, MD5, PKI, RSA, Diffie-Hellman, or other encryption, decryption, or verification functions. Midplane interface 104 provides connectivity between the IPSG and other system hardware.

These elements are tied together by service generator fabric 105, which manages and controls the other elements of the IPSG. The line interface 106 provides connectivity between the IPSG and one or more networked devices via one or more types of network connection. The network connection types may include, but are not limited to, Gigabit Ethernet, DS3/E3, POS, and ATM.

In some embodiments of the invention, multiple IPSG modules can be installed in a single router hardware chassis, and can provide functionality that supports a variety of network connection interfaces and protocols as well as a scalable increase in routing capacity.

Figure 2:
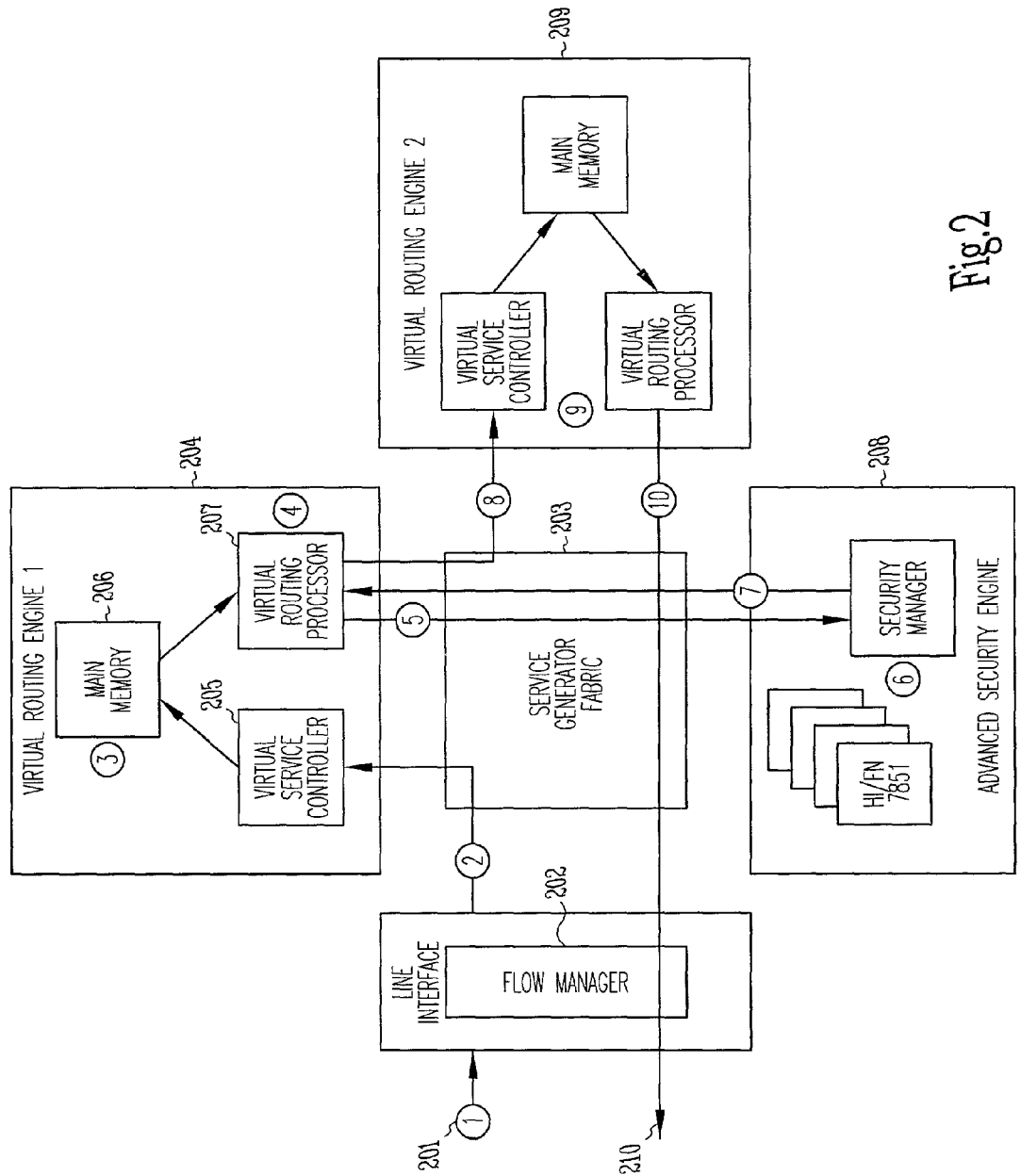
FIG. 2 shows a block diagram illustrating packet flow in the Internet Protocol Service Generator, consistent with an embodiment of the present invention.

FIG. 2 shows a block diagram illustrating flow of a typical example packet in the Internet Protocol Service Generator, consistent with an embodiment of the present invention. At 201, a packet is received via the network connection line interface, and is directed by the flow manager 202 which utilizes a steering table to determine which Virtual Local Area Network (VLAN) data is sent to which Virtual Routing Engine (VRE). The flow manager 202 tags the packet with an internal control header and transfers it across the service generator fabric 203 to the selected VRE at 204.

Upon arrival at the VRE, the packet enters a virtual services controller 205 for packet classification. Various packet fields, such as IP source and destination, UDP/TCP source and destination port numbers, IP protocol field, TOS field, IPSec header, and SPI field information are extracted. A flow cache is checked to determine whether the packet is to be processed in hardware or in software, and the packet is routed accordingly. In this example, the packet is to be processed in hardware, and so is passed on to main memory 206 from which it can be accessed by Virtual Routing Processor (VRP) 207. The VRP 207 retrieves the packet, identifies the packet processing actions that can be achieved in hardware, and performs those processes, which include such things as checksum adjustment, time-to-live adjustment, and other packet actions.

The example packet is then forwarded to the Advanced Security Engine (ASE) 208, where the packet is encrypted. The ASE 208 performs the encryption and prepends an IPSec tunnel header to the packet before routing the packet back to the VRP 207. The VRP 207 then forwards the packet to a second Virtual Routing Engine (VRE) 209, where a virtual router routes the packet through network interface connection 210.

Figure 3:
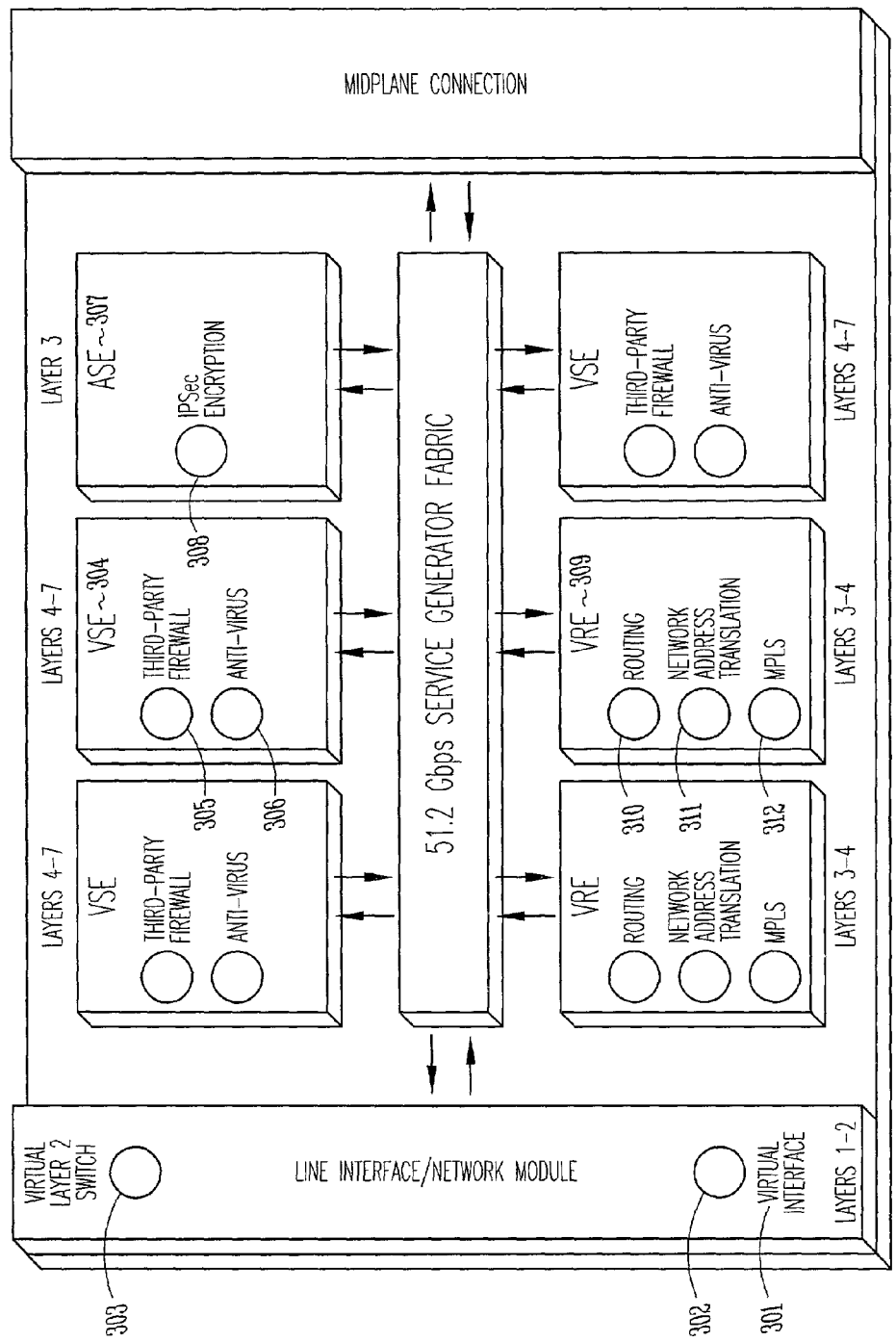
FIG. 3 shows a block diagram illustrating operation of the Internet Protocol Network Operating System in the context of the Internet Protocol Service Generator, consistent with an embodiment of the present invention.

FIG. 3 shows a block diagram illustrating operation of the Internet Protocol Network Operating System (IPNOS) in the context of the Internet Protocol Service Generator (IPSG), consistent with an embodiment of the present invention. The IPNOS provides customizable subscriber-level IP services through Virtual Router (VR) elements. The IPNOS creates a VR as an object group, where the objects include application layer, network layer, transport layer, data link layer, physical layer, and other objects. For example, a firewall may exist in a VR as an application layer object, and TCP/IP objects may exist as transport or network layer objects. Data link layer objects include VLAN or other such data link layer objects, and physical layer objects include ATM, DS3, or other physical layer objects.

These objects comprise various data definitions and methods, and so are capable of invoking methods in response to events, such as the arrival of a data packet. These objects can invoke their own methods, or other methods from other objects, and so can interact with each other, such as to perform task sharing. According to one embodiment, one element of each object type is required to execute. The object manager can then draw from available resources to provide the appropriate processing, and can manage the various resources such as the engines of FIGS. 1 and 2 to draw from resources tailored to a specific function.

The line interfaces and the network module 301 in FIG. 3 are tailored to handle data link and physical link layer tasks, such as providing a virtual interface 302 and virtual layer 2 switch 303. The Virtual Service Engine 304 is tailored to provide specific application layer, presentation layer, session layer, and transport layer functions, such as an application layer firewall 305 or an anti-virus module 306. The Advanced Security Engine 307 provides IPSec encryption, decryption, and verification via a module 308, which operates on network layer objects to provide security functionality. The Virtual Routing Engine 309 provides routing services 310, network address translation 311, Multi-Protocol Label Switching (MPLS) 312, and other network and transport layer functions. Because VR requests for a new object or resource are managed by the IPNOS, the IPNOS can dynamically allocate resources to optimize utilization of available processing resources.

Figure 4:
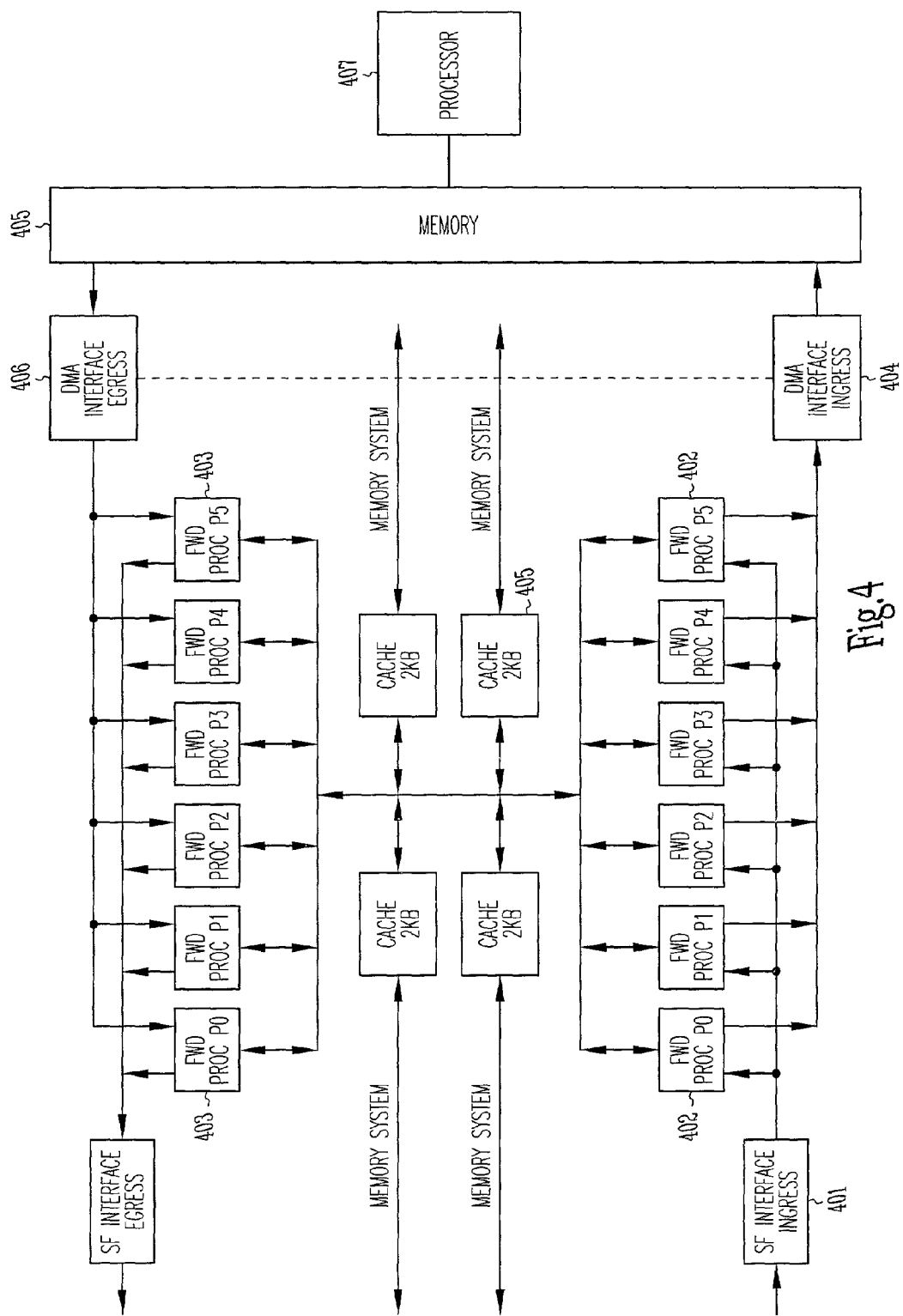
FIG. 4 illustrates the hardware architecture of a packet forwarding engine, consistent with an embodiment of the present invention.

FIG. 4 illustrates the hardware architecture of a packet forwarding engine 400, consistent with an example embodiment of the the present invention. The packet forwarding engine 400 performs hardware-assisted packet forwarding for a variety of network and transport layer packets, and includes functions such as flow cache route lookup forwarding and IP/MPLS forwarding of packets as well as packet header processing functions. The packet forwarding engine 400 of FIG. 4 is partitioned into ingress and egress portions, both for the switch fabric data interface and for the DMA memory interface.

Packets are received at the switch fabric interface 401, and are forwarded to one of a plurality of ingress processors 402. The ingress processors 402 are specially microcoded for ingress processing functionality, just as egress processors 403 are specially microcoded for egress processing. In one embodiment of the invention, each ingress processor 402 operates on one incoming packet and each egress processor 403 operates on one outgoing packet, and hardware interlocks maintain packet order.

The packet forwarding engine 400 ingress processors 402 pass the packet forwarding state parameters to the DMA engine or DMA interface ingress 404 that incorporates these state parameters into the packet receive descriptor. This forwarding state indicates whether the processor 407 should software forward the packet or whether the packet can bypass software processing and can be hardware processed. The forwarding state also includes an index into a forwarding transform cache that describes packet forwarding engine processing applied to each type of received packet.

For software forwarded packets, the receive descriptor for the packet is pushed into a DMA ingress descriptor queue such as in memory 405. Then, the software processing is performed in processor 407, and the result of processing the packet receive descriptor is routed to the DMA interface egress 406 as a packet transmit descriptor. For hardware forwarded packets, the receive descriptor bypasses the ingress descriptor queue and is pushed directly onto a DMA egress descriptor queue associated with the DMA interface egress module 406 as a packet transmit descriptor via a hardware forwarding engine.

Figure 5:
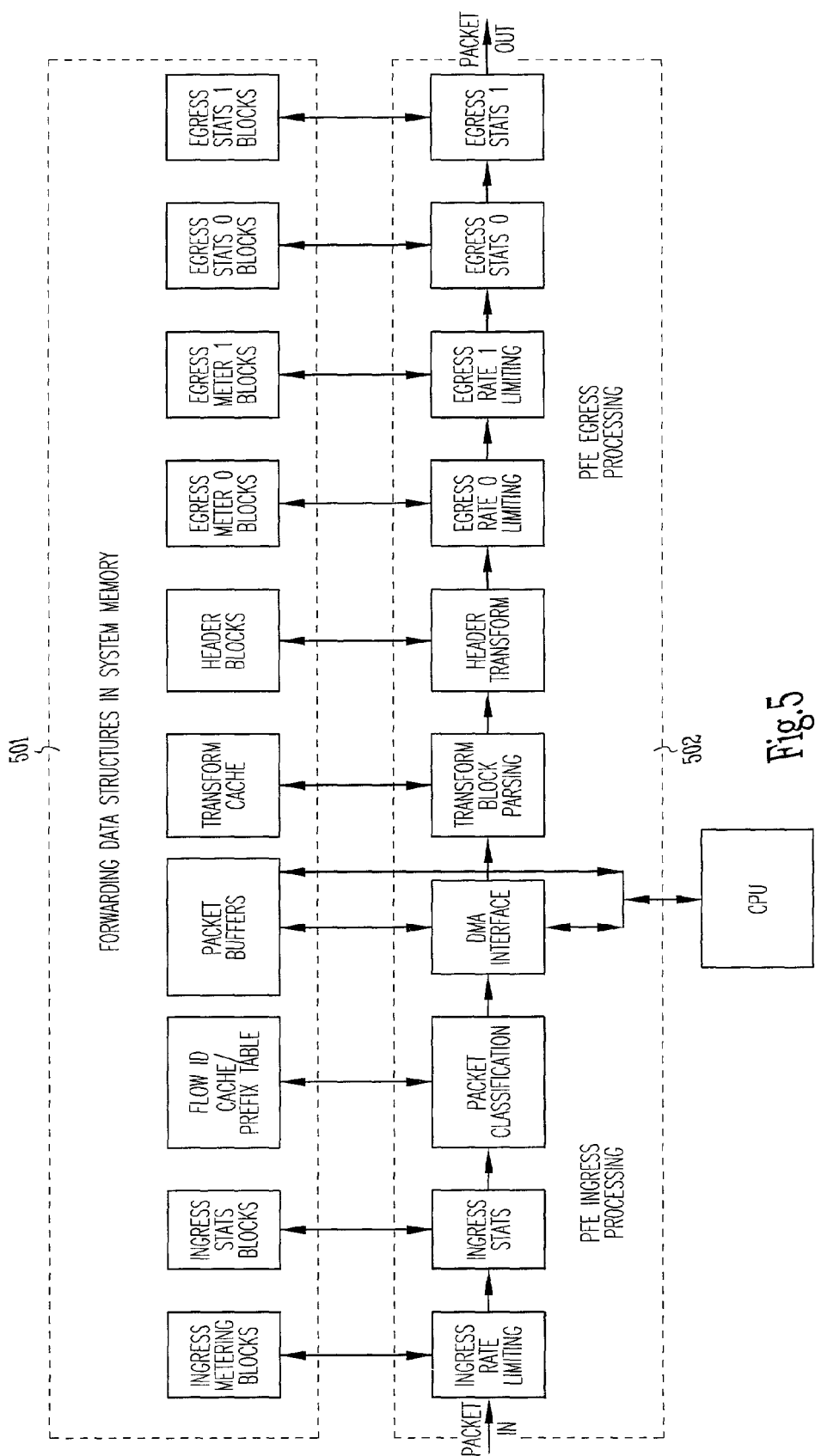
FIG. 5 illustrates the forwarding data structures stored in system memory and the packet forwarding ingress and egress processing method of one embodiment of he present invention.

FIG. 5 illustrates in greater detail the forwarding data structures stored in system memory at 501, and illustrates the packet forwarding ingress and egress processing method at 502. The data structure elements and ingress and egress processing are described in greater detail in a specific embodiment of the present invention described later in this document.

While the hardware forwarding engine on the IP Service Generator provides the fundamental packet forwarding functions and capability, IPNOS, or any other network operating system, needs to be able to take advantage of this capability to relieve itself of the burden of providing the basic forwarding and other IP services. The Packet Forwarding Engine Driver (PFED) API provides IPNOS a flexible interface to the PFE hardware.

The Hardware Forwarding Engine can operate either in Prefix mode or Flow mode. In prefix mode the forwarding is based on some number of bits of the destination IP address of the packet itself; no other IP services, such as filtering are available. In Flow mode, the forwarding is still based on the destination address but, for the purpose of providing IP services, packets are classified into "flows," a flow being characterized by many parameters associated with it.

The PFE driver, as well as the IP stack, treats the first packet of each new flow in a very special way, and that is because it is used to gather information about any packet filters, NAT rules, QoS, Metering and IP forwarding functions 5 that the user has chosen for this flow. According to the present example, there are three major elements to the process of pushing flows into hardware by the PFE driver:

(a) New flow identification
(b) Learning
(c) Flow setup

Additionally, PFE also supports an API to accomplish:

(d) CPU Forwarding Bandwidth Allocation
(e) PFE Forwarding Bandwidth Allocation

These two features of the PFE/PFED are powerful tools that allow creating virtual routers whose software or hardware forwarding bandwidth allocation remains unaffected by other virtualized routers in IPNOS.

New flow identification and flow setup for a new flow are transparent to IPNOS except that the software, given a learning packet, must either send the packet out or decide to terminate the flow. Both these cases are supported by the API.

Learning is accomplished as the packet traverses the software IP forwarding stack using the PFED API functions. The information collected is held in a buffer referred to as an 'annotation buffer' which is allocated and attached to all learning packets before being passed to the software stack. Flow setup is automatically handled by PFE driver when a learning packet is being forwarded.

Even though packet forwarding is handled by the PFE, the user may wish to have policies that specify that some flows be handled in software. In order to ensure that one virtualized IPNOS router is not starved by another more active router, the user may specify a certain CPU resource level per router at the time of its creation.

The PFE driver provides an interface to allow the user to allocate the PFE's forwarding capacity much like the CPU bandwidth allocation to ensure that one active router doesn't consume all the hardware PFE resources.

According to the present example, the API itself is broadly broken down into the following areas:

1. Statistics—The basic mechanism available to the OS to collect statistics is via a Statistics Control Block (SCB) allocated by the PFE driver, and then associating this SCB(s) to Ingress or Egress side.

2. Filter functions—Once it is determined that packets belonging to a particular flow qualify for discard action, the user can tag them such that they are discarded in the PFE itself.

3. QoS functions—The purpose of this function is to allow software to map IP QoS to different traffic classes.

4. Metering Functions—Metering functions allow the OS to apply QoS at the traffic level such that traffic for a given flow doesn't exceed the provisioned traffic parameters. As with statistics, one needs to create a Metering Control Block and associate an MCB to a flow such that the PFE can support metering.

5. NAT/IP/MPLS forwarding—This set of functions allows the PFE driver to capture basic IP forwarding functions and NAT specific parameters.

6. Software Forwarding—Packets belonging to some flows may need to be always handled in software as determined by criteria set by the user. This is accomplished by specifically using the function to tag packets as software-forwarded.

7. IPSEC flows—Packets that need to be encrypted/decrypted need to be processed appropriately to allow the PFE driver to collect IPSEC-specific parameters that are necessary to encrypt/decrypt the packets.

8. Stateful Packet Filter (SPF) flows—The Stateful Packet Filter feature allows applications to allow sessions based on policies configured by the user, and this means that user can take advantage of the PFE hardware to create events based on TCP flags to let software see only packets with specified flags. This requires that software first of all tag them as SPF-aware flows.

9. Driver Initialization—Since the driver can operate in three different modes—pass-thru, flow, and prefix mode, the driver exposes a function to allow a user to initialize the driver appropriately.

10. Receive—A packet received by the PFE must be first passed to PFE driver for handling. The driver will call a function to send packets that need to be handled outside of the driver.

11. Transmit—A packet that needs to be forwarded needs to be sent to the driver for learning termination and forwarding by calling a driver function, and the driver, in turn, will call a function to send the packet out.

12. PFE/IPNOS Forwarding Bandwidth allocation—The processors and the hardware forwarding engine collectively are single resources that are shared among all the virtual routers. This API provides the mechanism to distribute these resources to ensure fairness.

In one specific embodiment of the present invention described in the remainder of this specification in greater detail, the PFE maintains a table of Transform Control Blocks (TCBs), which direct how the egress controller processes outgoing packets. The egress controller uses the 20-bit forwarding index, carried by the DMA descriptor, to select a transform control block from the table before processing packets. Each transform control block entry contains 64-bytes formatted as described in the table below.

TABLE 10

Transform Control Block

| Word | Bits | Name | Description |
|---|---|---|---|
| 0 | 31:28 | PktCmd | Packet forwarding command: 0: Discard packet. 1: Forward packet. 2: Return packet to CPU. 3-15: Reserved |
|  | 27:20 | Reserved |  |
|  | 19:16 | PktDst | Forwarding destination for the packet: 0: Processor Engine 1: Security Engine 2: Line Interface 3: PPPoE Interface 4: Tunnel Interface 6-15: Reserved |
|  | 15:0 | PktMTU | Packet MTU |
| 1 | 31 | NAT_IP | Perform NAT on IP addresses. |
|  | 30 | DropCpuPkt | If this bit is set and the Pkt desc is HW_COH the packet is dropped |
|  | 29 | NAT_TCP | Perform NAT on TCP/UDP port addresses. |
|  | 28 | ReplaceRM | Replace Rate-Marking field in SF header. |
|  | 27 | ReplaceID | Replace IP header ID field with incremented PktID. |
|  | 26 | ValidCRC | Validate IP header checksum. |
|  | 25 | DecrTTL | Decrement the IP or MPLS header TTL value. |
|  | 24 | ReplacePRI | Replace Priority field in SF header. |
|  | 23:16 | TOS/EXP | IP TOS/MPLS EXP replacement value |
|  | 15:8 | TOS/EXP Enables | Enables for IP TOS/MPLS EXP replacement. (Set high to replace bit) |
|  | 7:4 | MPLS Operation | MPLS Operation Code 0: NOP 1: PUSH 2: POP_PEEK 3: POP_FWD 4: SWAP 5: POP_L2VPN_NULL 6: POP_L2VPN_CTRL |
|  | 3 | PWE3 Enable | PWE3 special case handling of L2 packets. |
|  | 2 | PWE3 Control | PWE3 control word should be added. Used when CW is "optional". |
|  | 1:0 | Reserved |  |
| 2 | 31:0 | StatsOutPtr0 | Memory pointer to egress statistics block 0. |
| 3 | 31:0 | StatsOutPtr1 | Memory pointer to egress statistics block 1 (Always assumed enabled) |
| 4 | 31:16 | HdrOffset | Indicates the number of bytes before the start of payload when an application specific header is located. Used for PPPoE. Also used for detunneling, indicates the number of bytes to strip before detunneling. |
|  | 15:0 | HdrLen | Byte length of the transform header. |
| 5 | 31:0 | HdrPtr | Memory pointer to the transform header data. |
| 6 | 31:0 | NAT.IPSrc | IP source address NAT replacement value. |
| 7 | 31:0 | NAT.IPDst | IP destination address NAT replacement value. |
| 8 | 31:16 | NAT.TCPSrc | TCP/UDP source Port NAT replacement value. |
|  | 15:0 | NAT.TCPDst | TCP/UDP destination port NAT replacement value. |
| 9 | 31:0 | PktIdPtr | Memory pointer to packet ID value. |
| 10 | 31:0 | MeterOutPtr0 | Memory pointer to egress metering control block 0. |
| 11 | 31:0 | MeterOutPtr1 | Memory pointer to egress metering control block 1. |
| 12 | 31:8 | Reserved |  |
|  | 7:0 | EgressQosIndex | Mode and memory pointer to the egress QOS translation table |
| 13 | 31:0 | L3 HeaderPtr | Memory pointer to the L3 encapsulation header |
| 14 | 31:0 | L3 HeaderSize | Size of the L3 encapsulation header |
| 15 | 31:16 | FCBTag | The value of the corresponding FCB pending tag must be written here to associate the TCB with the flow. A value of 0 needs to be written in prefix mode. |
|  | 15:0 | TCPChkAdj | TCP Checksum adjustment for TCP transforms. |

To update a Transform Control Block (TCB), host software sends a control packet containing a PFE_EGRESS_WR message with an address parameter that points to the new TCB. Software should issue the TCB update control packet before issuing the packet being forwarded. This ensures that the forwarded packet is processed according to the updated TCB.

There are a couple fields used to maintain packet order and associate the TCB with a specific flow. In flow mode, where several NEW packets for a flow could be sent to the CPU, there is a danger that once the CPU updates the TCB and FCB a packet could be hardware forwarded while the CPU still has packets for that flow. In one embodiment, packet order is maintained by a conflict cache in the DMA engine. Alternatively, packet order may be enforced by the TCB. When the TCB is written the DropCpuPkt bit should be zero, this will allow the CPU to send the NEW packets it has for that flow. However, when the first FWD_HW packet is seen with this bit clear, the forward engine will update the TCB and set this bit. Subsequent packets from the CPU (recognized because they are marked FWD_HW_COH) will be dropped.

There is also a consistency check performed between the FCB and the TCB. On ingress, the SF header SrcChan is replaced with the PendingTag field of the FCB. On egress, the SrcChan is compared against the FCBTag field of the TCB. If the tags mismatch, the packet is dropped. For prefix mode the SrcChan is replaced with zero, and the FCBTag field is initialized to zero.

In its simplest form, the packet header transformation involves the replacement of some number of header bytes of an ingress packet with some number of bytes of replacement header data. Under the control of a Transform Control Block, the PFE egress unit can selectively replace and recompute specific fields in a small set of protocol headers.

The PFE egress unit begins the header transform by stripping the incoming packet's SF header along with the number of bytes indicated by the SF header offset field. At that point, the controller will begin copying bytes from the buffer pointed to by the TCB's HDRPTR field into the egress packet buffer. The PFE will copy the number of new header bytes defined by the TCB's HDRLEN field.

After performing this header replacement, the PFE then goes through the TCB enable bits to determine what other header transformations need to be made. The sections below explain some of these transformations.

The PFE uses the TCB HDRLEN field to update the SF header length field for outgoing packets. By default, the PFE retains the SF header RM (rate marking) and PRI (priority) fields from the incoming packet in the outgoing packet. When the associated TCB's ReplaceQOS field is set, the PFE replaces the incoming RM and PRI fields with the values set in the TCB's header block. The PFE also replaces the RM field for outgoing packets when rate marking is enabled in the TCB. In cases where the hardware detects an exception that requires software processing, the PFE returns packet to the CPU and sets the SF header error code to 0x7.

The PFE egress controller supports independent replacement of the IP source and destination addresses to support IP NAT. It also supports replacement of the IP Type-of-Service (TOS) field. When enabled, the PFE egress controller will decrement the IP Time-To-Live Field and can conditionally replace the IP identification field based on the Transform Control Block's ReplaceID field. For a particular flow with the TCB ReplaceID field enabled, the PFE fetches the ID from the memory location pointed to by the TCB's PktIdPtr field. PFE increments the stored ID value after it replaces a packet's ID field.

For each IP header field transform, the PFE computes and applies an adjustment to the IP header checksum field. With a separate bit in the TCB, host software can request that the PFE validate the ingress IP header checksum field.

If the TCB PktDst field indicates that the packet is destined to the Security Engine, then the PFE egress controller replaces the security engine header Fragment Size field. If the TCB ReplaceID field is also set, the PFE performs packet ID replacement in the security engine header instead of the egress packet IP header.

If the TCB PktDst field indicates that the packet includes a PPPoE header, then the PFE egress unit must update the PPPoE payload length field before transmitting the packet. Software indicates the location of the PPPoE header by setting the TCB HdrOffset field to the number of bytes between the start of the PPPoE Header and the start of the L3 packet payload. The PFE egress unit will then update the last 2 bytes of the 6-byte PPPoE header with the packet's payload length. It computes the PPPoE payload using the following formula:

PPPoE Payload Length=L3 Payload Length+TCB HdrOffset Value−PPPoE header length (6 bytes).

In the event that the hardware detects an exceptional packet that requires software processing, the PFE controllers will return the packet to the CPU with the packet's SF Header Error field set to 0x6 and set the SF SrcChld to an error code. The Switch Fabric Document lists the possible error codes to get placed in the SF SrcChld.

The PFE egress unit independently rate limits ingress and egress packets, if enabled. As part of rate limiting, the PFE meters, marks and drops packets. The PFE performs ingress rate limiting before header transformation and performs egress rate limiting after header transformation. Software controls metering and rate marking using a combination of Metering Control Blocks (MCBs) and fields in the TCB and ingress Statistics Blocks.

The PFE implements both ingress and egress rate metering and marking according to the two-rate three color marker (trTCM) definition in RFC 2698. Per this definition, in color-blind mode the PFE marks the drop precedence color of a packet as Green if it does not exceed the CBS, Yellow if it exceeds the CBS but not the PBS, and Red if it exceeds both CBS and PBS. The packet's color is encoded into the rm field of the LQ header. The PFE increments the C and P buckets by the CIR and PIR values, respectively, in 1 ms intervals.

The PFE egress unit may optionally drop Yellow or Red packets or may color packets for a downstream dropper. The RateInCtl and RateOutCtl fields of the TCB control whether and how to drop packets on ingress and egress rate limiting.

A set of Metering Control Blocks (MCBs) maintained in system memory contain per flow (VR, VI, or ACL) trTCM parameters. Table 11 defines the MCB data structure in accordance with one embodiment of the present invention. Hardware provides three logical metering units: VI-based ingress metering, flow-based ingress metering, and flow-based egress metering. The TCB contains two MCB pointers for flow-based metering. The VI-based MCB pointer is contained in the VI-based stats block and will be discussed in more detail below.

TABLE 11

Metering Control Block

| Word | Bits | Name | Description |
| --- | --- | --- | --- |
| 0 | 31:0 | Green_bytes (lower) | Bottom 32 bits of green-metered bytes count. |
| 1 | 31:0 | Ctokens | Number of bytes in C token bucket |
| 2 | 31:0 | Ptokens | Number of bytes in P token bucket |
| 3 | 31:0 | Metered_pkts (lower) | Bottom 32 bits of metered packet count. |
| 4 | 31:0 | Yellow_bytes (lower) | Bottom 32 bits of yellow-metered bytes count. |
| 5 | 31:0 | Red_bytes (lower) | Bottom 32 bits of red-metered bytes count. |
| 6 | 31:0 | Timeslot | 1ms timeslot value. |
| 7 | 31:0 | Reserved | |
| 8 | 31:0 | CIR | Committed information rate in bytes/timeslot. |
| 9 | 31:0 | PIR | Peak information rate in bytes/timeslot. |
| 10 | 31:0 | CBS | Committed burst size in bytes. |
| 11 | 31:0 | PBS | Peak burst size in bytes. |
| 12 | 63:32 | Metered_pkts (upper) | Upper 32 bits of metered packet count. |
| 13 | 63:32 | Green_bytes (upper) | Upper 32 bits of green-metered byte count. |
| 14 | 63:32 | Yellow_bytes (upper) | Upper 32 bits of yellow-metered byte count. |
| 15 | 63:32 | Red_bytes (upper) | Upper 32 bits of red-metered byte count. |

Software controls where and how the hardware accesses MCBs by setting up arrangements of MCB pointers. In the present example, the MCB pointer data structure contains a 32-Byte aligned memory pointer along with mode control bits as detailed in the table below. In its simplest form, the pointer field indicates the memory location of a single MCB. In its most complex mode, the pointer indicates the location of an ordered array of up to 8 MCB pointers. When the hardware loads an MCB pointer array, it performs metering and rate marking starting with the first MCB pointer and continuing as directed by the Next Pointer field in the MCB pointer. Software can disable rate marking completely by setting all 4 bytes of the MCB pointer 0. The lowest 5 bits should be masked out before using this 4-byte word as the memory pointer.

TABLE 12

MCB Pointer Format

| Bit Field | Name | Description |
|---|---|---|
| 31:5 | Memory Pointer | This field contains a memory pointer to an MCB, an MCB pointer array, or a Rate Marking Translation Table. The Metering Mode field determines which mode to use. This pointer must be 32-byte aligned. |
| 4:3 | Metering Mode | This fields determines to what structure the Memory Pointer field points:<br>0: MCB - Color Blind<br>1: MCB - Color Aware<br>2: MCB Array<br>3: Reserved |
| 2:1 | Drop Policy | This field indicates the traffic policy:<br>0: No dropping<br>1: Drop on red marking only<br>2: Drop on yellow or red marking<br>3: Reserved |
| 0 | Next Pointer | This field indicates whether the hardware should continue to the next MCB pointer in an array:<br>0: Stop after the current pointer<br>1: Continue to the next MCB pointer in the array |

As a special optimization, software embeds the MCB pointer for the VI-based ingress metering in a reserved field of the VI-based ingress stats block. Software must guarantee that this reserved field of the stats block is always initialized to 0 in the case where metering is not enabled.

The VI-based statistics block also contains two MCB pointers for metering traffic bound for software. One pointer is for best effort traffic and the other is for control traffic. Software must initialize these pointers to 0 if metering is not enabled.

When IP/MPLS packets arrive at the ingress, the PFE uses the QOS pointer in the VI-based ingress stats block. This pointer indicates how the hardware translates the incoming TOS/EXP field into the LQ header's PRI and RM fields. If the pointer is NULL then the translation is skipped.

Similarly, as a final step before transmitting an IP/MPLS packet, the hardware takes the updated LQ header PRI and RM fields an reverse translates these back to the packet's TOS/EXP field. Again, if the QOS pointer is NULL then the translation is skipped.

The ingress QOS translation pointer resides in the last 4 bytes of the VI-based ingress stats block. For IP packets, the ingress table consists of 256 entries, indexed by the incoming packet's IP header TOS field. For MPLS packets, the ingress table consists of 8 entries, indexed by the incoming packet's MPLS EXP field. Each entry is 8 bytes wide (4 B mask, 4 B value). The ingress table entry format, in accordance with one embodiment, is described below:

TABLE 13

Ingress QOS Translation Table Entry Format for IP and MPLS

| Word | Bit Field | Name | Description |
|---|---|---|---|
| 0 | 31:25 | Reserved | Should be zero |
|   | 24:25 | RM Mask | Rate Marking Mask. Only bits to be replaced are high. |

TABLE 13-continued

Ingress QOS Translation Table Entry Format for IP and MPLS

| Word | Bit Field | Name | Description |
|---|---|---|---|
|   | 22:20 | PRI Mask | Priority Mask. Only bits to be replaced should be high. |
|   | 19:0 | Reserved | Should be zero. |
| 1 | 31:25 | Reserved | Should be zero |
|   | 24:23 | RM Value | New Rate Marking value |
|   | 22:20 | PRI Value | New Priority value |
|   | 19:0 | Reserved | Should be zero. |

The egress QOS translation pointer resides in word 12 of the associated TCB. The egress table consists of 32 entries indexed by the concatenation of the outgoing packet's {RM, PRII} SF header fields (the RM bits reside in the MSB of the table index). Each entry is 8 bytes wide (4 B mask, 4 B value). Exemplary egress table entry formats for IP and MPLS packets are described below:

TABLE 14

Egress QOS Table Entry Format for IP

| Word | Bit Field | Name | Description |
|---|---|---|---|
| 0 | 31:24 | Reserved | Should be zero. |
|   | 23:16 | TOS Mask | TOS Mask. Only bits to be replaced should be high. |
|   | 15:0 | Reserved | Should be zero. |
| 1 | 31:24 | Reserved | Should be zero. |
|   | 23:16 | TOS Value | New TOS value |
|   | 15:0 | Reserved | Should be zero. |

TABLE 15

Egress QOS Table Entry Format for MPLS

| Word | Bit Field | Name | Description |
|---|---|---|---|
| 0 | 31:12 | Reserved | Should be zero. |
|   | 11:9 | EXP Mask | EXP Mask. Only bits to be replaced should be high. |
|   | 8:0 | Reserved | Should be zero. |
| 1 | 31:12 | Reserved | Should be zero. |
|   | 11:9 | EXP Value | New EXP value |
|   | 8:0 | Reserved | Should be zero. |

The PFE hardware maintains packet statistics for all packets in Statistics Block data structures. The PFE updates both statsOutPtr0 and statsOutPtr1 egress packet statistics after header transformation. Along with the TCB stats block pointers for egress statsOutPtr0 and statsOutPtr1 flow statistics, the PFE also maintains per-VI ingress statistics using per-protocol tables indexed by LQID.

According to one embodiment, each statistics block contains three sets of counters, one set for normal packets and bytes, another for dropped packets and bytes and a third for packets with errors. The stats block also contains a field for counting the number of packets sent out as a fragmentation. There is a reserved field at the bottom of the stats block may be used for indicating ingress-VI metering control information. It should be initialized to 0 when the stats block is allocated.

TABLE 16

Ingress LQID Statistics Block

| Word | Bits | Name | Description |
|---|---|---|---|
| 0:1 | 63:0 | Trans_pkts | Number of packets transmitted. |
| 2:3 | 63:0 | Trans_bytes | Number of bytes transmitted. |
| 4:5 | 63:0 | Dropped_pkts | Number of packets dropped. |
| 6:7 | 63:0 | Dropped_bytes | Number of bytes dropped. |
| 8:9 | 63:0 | Error_pkts | Number of packet with errors. |
| 10:11 | 63:0 | Error_bytes | Number of bytes with errors. |
| 12 | 31:0 | MeterSwBEPtr | Pointer to meter block for software bound best effort traffic |
| 13 | 31:0 | MeterSwCtlPtr | Pointer to meter block for software bound control traffic |
| 14 | 31:0 | LQID | Pointer to Ingress VI rate-limiting control block. |
|  |  | Metering Ptr | Software should initialize this field to 0 when allocating the stats block. |
| 15 | 31:8 | FlowCapIndex | Index into table of Flow cap structures. |
|  | 15:10 | Flag bits | Mode dependent |
|  | 9:8 | Mode | 0 - Normal, 1 - L2 VPN, 2:3 - Reserved. |
|  | 7:0 | IngressQosIndx | Index into an array to TOS to RM/PRI translation tables. Software should initialize this field to 0 (disabled) when allocating the stats block. |

TABLE 17

Egress Flow Statistics Bytes

| Word | Bits | Name | Description |
|---|---|---|---|
| 0:1 | 63:0 | Trans_pkts | Number of packets transmitted. |
| 2:3 | 63:0 | Trans_bytes | Number of bytes transmitted. |
| 4:5 | 63:0 | Dropped_pkts | Number of packets dropped. |
| 6:7 | 63:0 | Dropped_bytes | Number of bytes dropped. |
| 8:9 | 63:0 | Error_pkts | Number of packets with errors. |
| 10:11 | 63:0 | Error_bytes | Number of bytes with errors. |
| 12:13 | 63:0 | Frag_pkts | Number of fragment packets transmitted |
| 14:15 | 63:0 | Frag_bytes | Number of fragment bytes transmitted.. |

The stats block pointer is bimodal in that it can points to single stats block or in the future to an array of stats block pointers. In array mode, the host software can associate up to 8 stats blocks with each of the TCB stats pointer fields. The PFE will traverse the table of pointers starting at the first entry and continuing as directed by the Next Pointer field. Software disables a table entry by setting all 4-bytes of the stats block pointer to 0. StatsOutPtr1 of the TCB is always assumed to be enabled to save instructions. If the either StatsOutPtr0 or StatsOutPtr is setup to point to something other than a stats block, then there can be dangerous memory corruption of that block and eventually other memory blocks.

TABLE 18

Statistics Block Pointer Format

| Bit Field | Name | Description |
|---|---|---|
| 31:5 | Pointer | PFE memory address to the associated stats block. The stats block is assumed to be 64-byte aligned. |
| 4:2 | Reserved |  |
| 1 | Pointer Mode | Defines whether the pointer field points to a stats block or to an array of stats block pointers:<br>0: Stats Block<br>1: Stats Block Pointer Array |

TABLE 18-continued

Statistics Block Pointer Format

| Bit Field | Name | Description |
|---|---|---|
| 0 | Next Pointer | This field indicates whether the hardware should continue to the next stats block pointer in array:<br>0: Stop after the current pointer.<br>1: Continue to the next stats block pointer. |

In both prefix-mode and flow-mode, the PFE hardware maintains per-VI ingress statistics in a set of tables of stats blocks indexed by the packets LQID and LQ protocol. The hardware selects a table using the packet's LQ protocol field and then selects the table entry using the LQID as an index. Per-VI ingress statistics are maintained for every packet.

The PFE hardware supports Network Address Translation for IP addresses and for TCP/UDP port addresses. When software enables IP or TCP/UDP NAT, it must also provide the associated replacement addresses and checksum adjustments in the corresponding TCB fields. When the hardware detects one of the NAT enable bits is set to '1', it will always replace both the source and destination addresses. If software intends to translate only the source address, it must still supply the correct destination address in the TCB replacement field. Similarly, the software must also supply the correct source address in the TCB replacement field when it is just replacing the destination address.

The checksum adjustment should be computed as follows:

$$ChkAdj = aNew + \sim aOld + bNew + \sim bOld + cNew + \sim cOld$$

where the + is a one's complement addition (meaning any carry bits are looped back and added to the LSB) and ~ is the inversion of all.

In one embodiment, on the ingress side, all layer 2 packets are distinguished by bit 5 of the SF header protocol field being set. The PFE micro-code checks this bit and jumps to separate L2 header loading logic when it is set. Separate code-points for each L2/L3 protocol are defined in the SF spec, jumping to the proper parsing logic is done by using the entire SF protocol (including the L2 bit) field as an index into a jump table and jumping to that instruction which causes a jump to the proper code segment. One of the functions of the L2 parsing logic is to determine the size of the variable length L2 headers and increment the SF offset field by that amount (in some cases, such as de-tunneling $2^{nd}$ pass) so that the PFE egress will strip off that part of the header. In addition, the SF protocol field may be changed (also $2^{nd}$ pass de-tunneling) to another protocol type depending what the underlying packet type is. This is also determined by the parsing logic and causes the proper egress code path to be taken.

Tunneling is the trivial case for L2 packet transformation. On the ingress side, a PPP packet arrives (LAC case), is parsed to get the protocol field for the hash, and the flow hash performed to determine the flow index. No SF header offset or protocol modification is done in this case. The actual tunneling is performed via the TCB on the egress side.

On the egress side, a new header is appended to the packet via normal TCB processing. In this case, the header would include IP/UDP/L2TP headers. Then all IP/MPLS specific transform logic is skipped and statistics, metering, etc is performed. The only new processing on the egress side is to update the ID field of the newly added IP header, and re-compute the IP checksum. To support this, a new PktDst code-point "Tunnel Interface" has been added. When the micro-code detects this code-point, the IP header (assumed to be just after the SF header) ID field is modified in a similar fashion as for "Security Engine" destined packets. The PktIdPtr field in the TCB is used to point to the current packet ID, the ID is read from memory, used to modify the IP header, incremented, and written back to memory. In this way, all that software needs to do to set-up for a tunnel is to set the TCB up with the properly formatted header block, ID header pointer, initialized ID value, and set the PktDst field to Tunnel.

For the LNS case, an IP packet is received on the ingress side and goes through normal IP header parsing logic and egress IP processing. According to one embodiment, the only difference is that the added TCB header must contain IP/UDP/L2TP/PPP in its contents. Everything else is as described above for the LAC case.

The De-Tunneling case is much tougher and involves two pass processing as well as two stage flow learning. In this case the incoming packet consists of IP-UDP-L2TP-PPP-IP-XXX-payload. The first pass is just like any normal IP packet, on the ingress the IP header is parsed and the flow hash is performed to determine a flow index. On the egress side normal IP TCB processing will be performed. Software must set-up the new header block with a new SF header such that the packet comes back (via the SF destination fields) to the ingress side of the PFE again for the second pass. In addition this new SF header must contain one of the newly defined L2 protocol code-points L2TP_LAC (41 including L2 bit), or L2TP_LNS (42 including L2 bit), and the SF offset field should be set with the proper offset to cause the $2^{nd}$ pass processing to look at the L2TP header.

According to the present example, on the second pass, the SF offset field now points to the L2TP-PPP-IP-XXX-payload part of the packet. Depending on the L2 protocol code-point the L2 parsing logic will go to different depths into the packet to gather the hash words for the flow hash. In the L2TP$_{13}$ LAC case only the L2TP header is parsed. In the L2TP_LNS case, the parsing goes into the encapsulated IP and even TCP/UDP headers, if present. This parsing again tells the egress logic how many bytes to adjust the SF offset field and which protocol to change the SF protocol field. For the LAC case, the protocol field will be changed to PPP and the offset field adjusted to point at the PPP header. For LNS it is changed to IP and the offset adjusted to point at the IP header. Changing of the protocol and offset fields in this manner causes the egress side to process what is left of the packet in the proper manner. The LAC case results in a PPP packet being sent to the egress logic, in this case all IP/MPLS specific logic is skipped and only stats/metering micro-code is executed. In the LNS case, an IP packet is presented to the egress and processed the same way as any other IP packet.

Tunneling packets via GRE is performed in exactly the same manner as for L2TP. IP/MPLS or some other packet type is received on the ingress side and processed normally by the ingress micro-code. On the egress side normal TCB header processing adds a SF/IP/GRE header to the packet. The PktDst "Tunnel" is detected which tells the egress micro-code to modify the outer IP header of the outgoing packet (in the same manner as described for L2TP) and the tunneling is complete.

De-Tunneling of GRE packets is done in the same two pass manner as L2TP with only the $2^{nd}$ pass parsing logic being different. On the ingress side, an IP packet is received (with protocol=47) and processed normally. On the egress side, the TCB adds a new SF header containing the L2 protocol type GRE, and a SF Dst field which causes the packet to be switched back to the ingress for a $2^{nd}$ pass. Again, this SF header should also contain an offset field that points $2^{nd}$ pass processing to the embedded GRE header.

On the $2^{nd}$ pass, the GRE parsing logic is executed (via the SF protocol jump table) to gather the required fields for the flow hash and to determine the size of the L2 header and what underlying protocol is being tunneled. Which fields are used in the flow hash is determined by the parsing logic depending on what is being tunneled. The SF offset field is incremented to point at the tunneled packet; and for IP or MPLS the SF protocol field is changed to those corresponding code-points.

On the $2^{nd}$ pass egress side, the underlying tunneled packet is processed depending on the SF protocol field. If an IP or MPLS packet was tunneled, then they are processed as any IP or MPLS packet would. If some other protocol was tunneled, then the protocol field was not changed by the $2^{nd}$ pass ingress micro-code and the code-point still is L2 GRE. This packet is processed as any L2 packet, skipping all IP/MPLS specific transforms and jumping straight to stats/metering. In this case, the underlying tunneled packet is just forwarded as is, without any special processing.

PWE3 tunneling is a special case, which is done on an LQ basis. In this case, the ingress packet will be received with some L2 protocol (Ethernet, VLAN, PPP, AAL5, Frame Relay) but will not be processed as such, instead a per LQ enable is provided in the statistics block which will tell the micro-code that special handling is required. According to one embodiment, this feature is enabled when the 2 bit mode field in the stats block is set to 1 (L2 VPN mode). When this is detected by the ingress micro-code, it causes the flow hash to be computed using only the LQID.

In one embodiment, on the egress side, 2 bits are provided in the TCB, one for PWE3 enable, and one for control word tag enable. The egress micro-code will check the PWE3 enable bit for all L2 packets and if it is enabled will perform special PWE3 handling. This includes stripping of any required headers from the L2 packet and tagging on of the control word between the SF/Tunnel/VC header added by the TCB and the remainder of the L2 packet. When the egress micro-code detects an L2 packet with the PWE3 enable bit set in the TCB, it looks at the SF protocol field to determine a further course of action. For AAL5 and Frame Relay, the control word is required and some of the L2 packet must be discarded. In these cases, the micro-code will load the proper amount of header (2 byte frame header for frame relay, and 16 byte Maker header for AAL5) to construct the control word. After creating the control word, the header is discarded by subtracting the correct amount from the packet length. The control word is then added to the packet at the proper location on transmit by putting it in the new L3 header. For all other protocols, the control word is optional, so the control word enable bit is checked and if set a "dummy" control word will be added in the same manner as before.

De-Tunneling of PWE3 packets is performed on the egress side with the addition of a couple of new MPLS operation code-points (POP_L2VPN_NULL and POP_L2VPN_CTRL). On the ingress side, an MPLS packet is received and hashed normally to determine the flow index. In one embodiment, the MPLS tag is actually a "Martini" VC header and is popped in a special way by the egress micro-code. When one of these two MPLS operations is encountered, the micro-code will look at the new SF header (added via the TCB) protocol field to determine what to do next. If the protocol is AAL5 or Frame Relay, then a control word is present and is pulled off and used to modify the L2 header template following the SF header in the TCB header block. Any other protocol field, such as VLAN, Ethernet, or PPP, for example, will cause the MPLS operation to be looked at again. If the operation is POP-L2VPN_NULL, then de-tunneling is complete, if it is POP_L2VPN_CTRL, then the "dummy" optional control word is pulled off and discarded before de-tunneling is complete.

The embodiments of the invention described above are provided for completeness and sake of illustration. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is intended that this invention be limited only by the claims, and the full scope of equivalents thereof.

The invention claimed is:

1. A method comprising:
    receiving a packet by a flow manager associated with a network interface connection of an Internet Protocol Service Generator (IPSG), the IPSG including
    a plurality of virtual routing engines (VREs) coupled to the network interface connection via a service generator fabric, each VRE of the plurality of VREs providing one or more network layer and transport layer functions corresponding to the Open Systems Interconnection (OSI) model, including one or more of routing services, network address translation (NAT) and Multi-Protocol Label Switching (MPLS), and
    a plurality of virtual service engines (VSEs) coupled to the network interface connection and the plurality of VREs via the service generator fabric, each VSE of the plurality of VSEs tailored to provide one or more specific application layer, presentation layer, session layer and transport layer functions corresponding to the OSI model, including one or more of encryption, packet filtering and anti-virus scanning;
    the flow manager selecting a VRE of the plurality of VREs to which to direct the packet based on a steering table, which contains a mapping of Virtual Local Area Networks (VLANs) to the plurality of VREs;
    the flow manager directing the packet to the selected VRE by tagging the packet with an internal control header and transferring the packet across the service generator fabric;
    responsive to receiving the packet at the selected VRE, the selected VRE determining whether the packet is to be processed in hardware or in software by performing packet classification and a flow cache lookup;
    if the flow cache lookup indicates the packet is a first packet of a new flow and is therefore to be processed in software, then the VRE (i) causing a plurality of functions at a plurality of OSI model layers to be applied to the packet by internally routing the packet to one or more of the plurality of VSEs and one or more of the plurality of VREs and (ii) performing flow learning by tracking the plurality of functions applied and storing information regarding the plurality of functions in a transform control block (TCB) record corresponding to the new flow;
    if the flow cache lookup indicates the packet is associated with a previously learned flow and is therefore to be processed in hardware, then the VRE causing a plurality of functions identified in a previously created TCB record to be applied to the packet by internally routing the packet to one or more of the plurality of VSEs and one or more of the plurality of VREs; and
    a VRE of the one or more VREs routing the packet through the network interface.

2. The method of claim 1, wherein the plurality of VSEs include at least one advanced security engine configured to provide security functionality for one or more security protocols.

3. The method of claim 1, wherein the flow cache lookup is based upon various fields of the packet including one or more of Internet Protocol (IP) source, IP destination, Universal Datagram Protocol (UDP)/Transmission Control Protocol (TCP) source port number, UDP/TCP destination port number, IP protocol field, type of service (TOS) field, Internet Protocol Security (IPSec) header and Security Parameters Index (SPI) field information.

4. The method of claim 1, further comprising maintaining a set of metering control blocks for use in connection with enforcing provisioned traffic parameters on traffic flows.

5. A machine-readable medium with instructions stored thereon, the instructions when executed by an Internet Protocol Service Generator (IPSG) operable to cause application of functions to network data packets received by the IPSG by:
    receiving a packet by a flow manager associated with a network interface connection of the IPSG, the IPSG including
    a plurality of virtual routing engines (VREs) coupled to the network interface connection via a service generator fabric, each VRE of the plurality of VREs providing one or more network layer and transport layer functions corresponding to the Open Systems Interconnection (OSI) model, including one or more of routing services, network address translation (NAT) and Multi-Protocol Label Switching (MPLS), and
    a plurality of virtual service engines (VSEs) coupled to the network interface connection and the plurality of VREs via the service generator fabric, each VSE of the plurality of VSEs tailored to provide one or more specific application layer, presentation layer, session layer and transport layer functions corresponding to the OSI model, including one or more of encryption, packet filtering and anti-virus scanning;
    the flow manager selecting a VRE of the plurality of VREs to which to direct the packet based on a steering table, which contains a mapping of Virtual Local Area Networks (VLANs) to the plurality of VREs;
    the flow manager directing the packet to the selected VRE by tagging the packet with an internal control header and transferring the packet across the service generator fabric;
    responsive to receiving the packet at the selected VRE, the selected VRE determining whether the packet is to be processed in hardware or in software by performing packet classification and a flow cache lookup;
    if the flow cache lookup indicates the packet is a first packet of a new flow and is therefore to be processed in software, then the VRE (i) causing a plurality of functions at a plurality of OSI model layers to be applied to the packet by internally routing the packet to one or more of the plurality of VSEs and one or more of the plurality of VREs and (ii) performing flow learning by tracking the plurality of functions applied and storing information regarding the plurality of functions in a transform control block (TCB) record corresponding to the new flow;

if the flow cache lookup indicates the packet is associated with a previously learned flow and is therefore to be processed in hardware, then the VRE causing a plurality of functions identified in a previously created TCB record to be applied to the packet by internally routing the packet to one or more of the plurality of VSEs and one or more of the plurality of VREs; and a VRE of the one or more VREs routing the packet through the network interface.

6. The machine-readable medium of claim 5, wherein the plurality of VSEs include at least one advanced security engine configured to provide security functionality for one or more security protocols.

7. The machine-readable medium of claim 5, wherein the flow cache lookup is based upon various fields of the packet including one or more of Internet Protocol (IP) source, IP destination, Universal Datagram Protocol (UDP)/Transmission Control Protocol (TCP) source port number, UDP/TCP destination port number, IP protocol field, type of service (TOS) field, Internet Protocol Security (IPSec) header and Security Parameters Index (SPI) field information.

8. The machine-readable medium of claim 5, wherein the instructions further cause a set of metering control blocks to be maintained for use in connection with enforcing provisioned traffic parameters on traffic flows.

9. An Internet Protocol Service Generator (IPSG) system comprising:
a flow manager means, associated with a network interface connection of the IPSG, for receiving packets;
a plurality of virtual routing engine (VRE) means coupled to the network interface connection via a service generator fabric, each VRE means of the plurality of VRE means for providing one or more network layer and transport layer functions corresponding to the Open Systems Interconnection (OSI) model, including one or more of routing services, network address translation (NAT) and Multi-Protocol Label Switching (MPLS),
a plurality of virtual service engine (VSE) means coupled to the network interface connection and the plurality of VRE means via the service generator fabric, each VSE means of the plurality of VSE means for providing one or more specific tailored application layer, presentation layer, session layer and transport layer functions corresponding to the OSI model, including one or more of encryption, packet filtering and anti-virus scanning;
wherein the flow manager means is further for
selecting a VRE means of the plurality of VRE means to which to direct the received packets based on a steering table, which contains a mapping of Virtual Local Area Networks (VLANs) to the plurality of VRE means; and
directing the received packets to the selected VRE means by tagging the packets with internal control headers and transferring the received packets across the service generator fabric; and
wherein the VRE means are further for
determining whether the received packets are to be processed in hardware or in software by performing packet classification and a flow cache lookup;
causing a plurality of functions at a plurality of OSI model layers to be applied to the received packets by internally routing the received packets to one or more of the plurality of VSE means and one or more of the plurality of VRE mean and (ii) performing flow learning by tracking the plurality of functions applied and storing information regarding the plurality of functions in a transform control block (TCB) record corresponding to a new flow if the flow cache lookup indicates the received packets are a first packet of the new flow and are therefore to be processed in software;
causing a plurality of functions identified in a previously created TCB record to be applied to the received packets by internally routing the received packets to one or more of the plurality of VSE means and one or more of the plurality of VRE means, if the flow cache lookup indicates the received packets are associated with one of a plurality of previously learned flows and are therefore to be processed in hardware; and
routing the received packets through the network interface.

10. The IPSG system of claim 9, wherein the plurality of VSEs include at least one advanced security engine configured to provide security functionality for one or more security protocols.

11. The IPSG system of claim 9, wherein the flow cache lookup is based upon various fields of the packet including one or more of Internet Protocol (IP) source, IP destination, Universal Datagram Protocol (UDP)/Transmission Control Protocol (TCP) source port number, UDP/TCP destination port number, IP protocol field, type of service (TOS) field, Internet Protocol Security (IPSec) header and Security Parameters Index (SPI) field information.

12. The IPSG system of claim 9, wherein the flow manager means is further for maintaining a set of metering control blocks for use in connection with enforcing provisioned traffic parameters on traffic flows.

13. A method comprising:
a step for receiving a packet by a flow manager associated with a network interface connection of an Internet Protocol Service Generator (IPSG), the IPSG including
a plurality of virtual routing engines (VREs) coupled to the network interface connection via a service generator fabric, each VRE of the plurality of VREs providing one or more network layer and transport layer functions corresponding to the Open Systems Interconnection (OSI) model, including one or more of routing services, network address translation (NAT) and Multi-Protocol Label Switching (MPLS), and
a plurality of virtual service engines (VSEs) coupled to the network interface connection and the plurality of VREs via the service generator fabric, each VSE of the plurality of VSEs tailored to provide one or more specific application layer, presentation layer, session layer and transport layer functions corresponding to the OSI model, including one or more of encryption, packet filtering and anti-virus scanning;
a step for selecting, by the flow manager, a VRE of the plurality of VREs to which to direct the packet based on a steering table, which contains a mapping of Virtual Local Area Networks (VLANs) to the plurality of VREs;
a step for directing, by the flow manager, the packet to the selected VRE by tagging the packet with an internal control header and transferring the packet across the service generator fabric;
a step, responsive to receiving the packet at the selected VRE, for determining, by the selected VRE, whether the packet is to be processed in hardware or in software by performing packet classification and a flow cache lookup;
if the flow cache lookup indicates the packet is a first packet of a new flow and is therefore to be processed in software, then the VRE (i) causing a plurality of functions at a plurality of OSI model layers to be applied to the packet by internally routing the packet to one or more of the plurality of VSEs and one or more of the plurality of VREs and (ii) performing flow learning by tracking the plurality of functions applied and storing information regarding the plurality of functions in a transform control block (TCB) record corresponding to the new flow;

if the flow cache lookup indicates the packet is associated with a previously learned flow and is therefore to be processed in hardware, then the VRE causing a plurality of functions identified in a previously created TCB record to be applied to the packet by internally routing the packet to one or more of the plurality of VSEs and one or more of the plurality of VREs; and a step for routing, by a VRE of the one or more VREs, the packet through the network interface.

14. The method of claim 13, wherein the plurality of VSEs include at least one advanced security engine configured to provide security functionality for one or more security protocols.

15. The method of claim 13, wherein the flow cache lookup is based upon various fields of the packet including one or more of Internet Protocol (IP) source, IP destination, Universal Datagram Protocol (UDP)/Transmission Control Protocol (TCP) source port number, UDP/TCP destination port number, IP protocol field, type of service (TOS) field, Internet Protocol Security (IPSec) header and Security Parameters Index (SPI) field information.

16. The method of claim 13, further comprising a step for maintaining a set of metering control blocks for use in connection with enforcing provisioned traffic parameters on traffic flows.

* * * * *